US012585687B2

(12) United States Patent
Sankey et al.

(10) Patent No.: US 12,585,687 B2
(45) Date of Patent: Mar. 24, 2026

(54) TECHNIQUES FOR IMPROVING PROJECT DATA STORAGE BY GENERATING STANDARDIZED DATA STORAGE TEMPLATES

(71) Applicant: Northspyre, Inc., Brooklyn, NY (US)

(72) Inventors: William Sankey, Atlanta, GA (US); Matthew Phinney, Brooklyn, NY (US)

(73) Assignee: Northspyre, Inc., Brooklyn, NY (US)

( * ) Notice: Subject to any disclaimer, the term of this patent is extended or adjusted under 35 U.S.C. 154(b) by 0 days.

(21) Appl. No.: 18/812,267

(22) Filed: Aug. 22, 2024

(65) Prior Publication Data

US 2026/0057000 A1 Feb. 26, 2026

(51) Int. Cl.
| | |
|---|---|
| *G06F 16/35* | (2025.01) |
| *G06F 16/334* | (2025.01) |
| *G06F 16/338* | (2019.01) |

(52) U.S. Cl.
CPC .......... G06F 16/35 (2019.01); G06F 16/3344 (2019.01); G06F 16/338 (2019.01)

(58) Field of Classification Search
CPC ...................................................... G06F 16/35
See application file for complete search history.

(56) References Cited

U.S. PATENT DOCUMENTS

| | | | | |
|---|---|---|---|---|
| 2022/0327119 A1* | 10/2022 | Gasper | ............... | G06F 16/9024 |
| 2023/0252550 A1* | 8/2023 | Baltescu | ............. | G06F 16/9024 |
| | | | | 705/26.7 |
| 2024/0265913 A1* | 8/2024 | Laptev | ................... | G10L 15/16 |

* cited by examiner

*Primary Examiner* — Van H Oberly

(74) *Attorney, Agent, or Firm* — MARSHALL, GERSTEIN & BORUN LLP

(57) ABSTRACT

Techniques for improving project data storage by generating standardized data storage templates are disclosed. An example system aggregates project data corresponding to at least two projects that is in a non-standardized format, extracts text data from the project data, and inputs the text data and an input prompt into a first machine learning (ML) model configured to extract one or more services indicated by the text data. The example system further generates a text embedding for each service and applies a second ML model to (i) the services and (ii) the text embeddings. Applying the second ML model includes: clustering the services and the text embeddings into a set of clusters, and generating, based on the clusters, at least one data storage template indicating a standardized set of services in a standardized format for projects with associated project data included in one or more clusters.

20 Claims, 5 Drawing Sheets

400

Start

402 — Aggregate Project Data From One Or More Sets Of Project Data Stored In A Project Database, The Project Data Corresponding To At Least Two Projects Of A Plurality Of Projects, And The Project Data Being In A Non-Standardized Format 404 — Extract Text Data From The Project Data 406 — Input The Text Data And An Input Prompt Into A First Machine Learning (ML) Model Configured To Extract One Or More Services Indicated By The Text Data 408 — Generate A Text Embedding For Each Service Of The One Or More Services 410 — Apply A Second ML Model To (i) The One Or More Services And (ii) The Text Embeddings To Cluster The One Or More Services And The Text Embeddings Into A Set Of Clusters Based On Similarity Values Indicating Similarities Between (i) One Or More Of The One Or More Services And (ii) One Or More Of The Text Embeddings 412 — Apply The Second ML Model To (i) The One Or More Services And (ii) The Text Embeddings To Generate, Based On The Set Of Clusters, At Least One Data Storage Template Indicating A Standardized Set Of Services In A Standardized Format For Projects With Associated Project Data Included In One Or More Clusters Of The Set Of Clusters

_200_

Landscape Architect (Global Budget Category)

Landscape Architect | Landscape Design | 65-22-3000-Landscape Architect | Landscape Consultant (Rooftop And Site)

_220_

_240_

TECHNIQUES FOR IMPROVING PROJECT DATA STORAGE BY GENERATING STANDARDIZED DATA STORAGE TEMPLATES

FIELD OF THE DISCLOSURE

The present aspects relate to data management systems, and more particularly, to systems for improving project data storage by generating standardized data storage templates, such as generating standardized data storage templates based on clusters of services and text embeddings.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the domain of project management, particularly within real estate development, the management of project data, including contracts, budgets, and vendor information, has historically been a challenging task. These projects commonly involve multiple, independent contributors/participants (e.g., contractors, subcontractors, etc.) performing various actions/services at different times and/or locations as part of a single project, such that project management is tasked with tracking each service/task completed by each individual contributor. Moreover, each of the individual project participants typically store records of performed tasks/services locally in non-standardized formats based on whichever hardware or software platform is in use by the individual participant.

As such, it is conventionally a substantial challenge for project management to effectively manage and share updated project data with participants, leading to project stalling and duplicated and/or erroneously forgotten services/actions. For example, project management must continually monitor and pressure project participants for updated project data, which is frequently incomplete or inconsistent because the disparate updates are untimely (i.e., late) or not readily shared and/or cannot be consolidated due to significant format inconsistencies. Further, each participant (e.g., contractor, subcontractor) may generally be unaware of the actions/services completed, in progress, and/or scheduled by other participants, thereby increasing the confusion conventional techniques cause in project management. Overall, such a lack of standardization present in conventional techniques hinders the ability to effectively benchmark, compare, and analyze project data across different projects or within an organization (e.g., an individual project management organization), limiting the capability for informed decision-making and optimization of resources.

Furthermore, conventional techniques compound these issues by creating confusing/uncertain work commitments for each project participant at the bidding stage. The process of bid management and decision-making in project development frequently involves sifting through vast amounts of historical data to evaluate bids based on past project outcomes. Project management is tasked with determining the services each project participant should be expected to perform and comparing those expected services with bid proposals (e.g., contracts with proposed statements of work and covered services) that often deviate from the expectation(s). The manual nature of these processes, coupled with the challenge of mapping unique project data to non-standardized categories for meaningful comparison, constrains the efficiency and accuracy of bid evaluations. For example, the creation and management of cash flow projections and reports using conventional methods are often time-consuming, imprecise, and lack flexibility, posing challenges in adapting to the dynamic needs of project management.

Given these challenges, there are opportunities for improved platforms and technologies for solving the identified conventional problems.

SUMMARY

In some aspects, the techniques described herein relate to a system for improving project data storage by generating standardized data storage templates including: one or more processors; and one or more memories communicatively coupled with the one or more processors, the one or more memories storing a project database storing sets of project data for a plurality of projects, and computer executable instructions that, when executed by the one or more processors, cause the one or more processors to: aggregate project data from the sets of project data corresponding to at least two projects of the plurality of projects, the project data being in a non-standardized format, extract text data from the project data, input the text data and an input prompt into a first machine learning (ML) model configured to extract one or more services indicated by the text data, generate a text embedding for each service of the one or more services, and apply a second ML model to (i) the one or more services and (ii) the text embeddings, wherein applying the second ML model includes: clustering the one or more services and the text embeddings into a set of clusters based on similarity values indicating similarities between (i) one or more of the one or more services and (ii) one or more of the text embeddings, and generating, based on the set of clusters, at least one data storage template indicating a standardized set of services in a standardized format for projects with associated project data included in one or more clusters of the set of clusters.

In some aspects, the techniques described herein relate to a system, wherein the second ML model is a clustering model, wherein the at least one data storage template is a plurality of data storage templates, and wherein applying the clustering model further includes: determining a primary data storage template indicating the standardized set of services based on a cluster size of a first cluster of the set of clusters.

In some aspects, the techniques described herein relate to a system, wherein the computer executable instructions, when executed by the one or more processors, cause the one or more processors to: generate the text embedding for the one or more services using a third ML model configured to generate text embeddings.

In some aspects, the techniques described herein relate to a system, wherein the first ML model is a large language model (LLM), and wherein extracting the one or more services indicated by the text data further includes: inferring at least one of the one or more services from the text data.

In some aspects, the techniques described herein relate to a system, wherein the computer executable instructions, when executed by the one or more processors, cause the one or more processors to: receive new project data associated with a new project, the new project data having a first file size; cluster the new project data into the one or more clusters of the set of clusters; convert the new project data into the standardized format indicated by a first data storage template of the at least one data storage template, wherein the converted new project data has a second file size that is less than the first file size; and store the new project data in the project database.

In some aspects, the techniques described herein relate to a system, wherein the computer executable instructions, when executed by the one or more processors, cause the one or more processors to: determine one or more project thresholds based on project data stored in the project database in the standardized format; determine that the new project data exceeds at least one of the one or more project thresholds; and generate an alert in real-time for transmission to all entities associated with the new project.

In some aspects, the techniques described herein relate to a system, wherein the new project data is a first set of project data, the new project is a first project, and the computer executable instructions, when executed by the one or more processors, further cause the one or more processors to, in parallel with the first project by utilizing parallel processing: receive a second set of project data associated with a second project, the second set of project data having a third file size; cluster the second set of project data into the one or more clusters of the set of clusters; convert the second set of project data into the standardized format indicated by the first data storage template, wherein the converted second set of project data has a fourth file size that is less than the third file size; and store the second set of project data in the project database.

In some aspects, the techniques described herein relate to a system, wherein the computer executable instructions, when executed by the one or more processors, further cause the one or more processors to: receive a request corresponding to a new project; apply a third ML model to the request to output a request indication, wherein the third ML model is trained using a plurality of request training data and a plurality of project training data from the sets of project data to output a plurality training request indications; and display the request indication to a user associated with the new project.

In some aspects, the techniques described herein relate to a system, wherein the computer executable instructions, when executed by the one or more processors, further cause the one or more processors to: apply a third ML model to new project data of a new project to output a request transmission indication, wherein the third ML model is trained using a plurality of request transmission training data and a plurality of project training data from the sets of project data to output a plurality training request transmission indications; display the request transmission indication to a user associated with the new project; and responsive to receiving an acceptance from the user, transmitting a new request to an entity managing the new project, wherein the new request includes request data corresponding to the request transmission indication.

In some aspects, the techniques described herein relate to a system, wherein the computer executable instructions, when executed by the one or more processors, cause the one or more processors to: receive subsequent project data associated with a subsequent project; and apply the second ML model to the subsequent project data, wherein applying the second ML model includes: clustering the subsequent project data into a new cluster, and generating a new data storage template indicating a new standardized set of services in a new standardized format for projects with associated project data included in the new cluster.

In some aspects, the techniques described herein relate to a system, wherein the second ML model is trained using a plurality of training project data as input to output a plurality of training data storage templates.

In some aspects, the techniques described herein relate to a system, wherein extracting the text data from the project data includes utilizing at least one of: (i) optical character recognition (OCR), (ii) image recognition, (iii) object recognition, or (iv) image extrapolation.

In some aspects, the techniques described herein relate to a computer-implemented method for improving project data storage by generating standardized data storage templates including: aggregating, by one or more processors, project data from one or more sets of project data stored in a project database, the project data corresponding to at least two projects of a plurality of projects, and the project data being in a non-standardized format; extracting, by the one or more processors, text data from the project data; inputting, by the one or more processors, the text data and an input prompt into a first machine learning (ML) model configured to extract one or more services indicated by the text data; generating, by the one or more processors, a text embedding for each service of the one or more services; and applying, by the one or more processors, a second ML model to (i) the one or more services and (ii) the text embeddings, wherein applying the second ML model includes: clustering the one or more services and the text embeddings into a set of clusters based on similarity values indicating similarities between (i) one or more of the one or more services and (ii) one or more of the text embeddings, and generating, based on the set of clusters, at least one data storage template indicating a standardized set of services in a standardized format for projects with associated project data included in one or more clusters of the set of clusters.

In some aspects, the techniques described herein relate to a computer-implemented method, wherein the second ML model is a clustering model, wherein the at least one data storage template is a plurality of data storage templates, and wherein applying the clustering model further includes: determining, by the one or more processors, a primary data storage template indicating the standardized set of services based on a cluster size of a first cluster of the set of clusters.

In some aspects, the techniques described herein relate to a computer-implemented method, further including: generating, by the one or more processors, the text embedding for the one or more services using a third ML model configured to generate text embeddings.

In some aspects, the techniques described herein relate to a computer-implemented method, wherein the first ML model is a large language model (LLM), and wherein extracting the one or more services indicated by the text data further includes: inferring, by the one or more processors, at least one of the one or more services from the text data.

In some aspects, the techniques described herein relate to a computer-implemented method, further including: receiving, at the one or more processors, new project data associated with a new project, the new project data having a first file size; clustering, by the one or more processors, the new project data into the one or more clusters of the set of clusters; converting, by the one or more processors, the new project data into the standardized format indicated by a first data storage template of the at least one data storage template, wherein the converted new project data has a second file size that is less than the first file size; and storing, by the one or more processors, the new project data in the project database.

In some aspects, the techniques described herein relate to a computer-implemented method, further including: receiving, at the one or more processors, a request corresponding to a new project; applying, by the one or more processors, a third ML model to the request to output a request indication, wherein the third ML model is trained using a plurality of request training data and a plurality of project training data from the sets of project data to output a plurality training request indications; and displaying, by the one or more processors, the request indication to a user associated with the new project.

In some aspects, the techniques described herein relate to a tangible machine-readable medium including instructions that, when executed, cause a machine to at least: aggregate project data from one or more sets of project data corresponding to at least two projects of a plurality of projects, the project data being in a non-standardized format; extract text data from the project data; input the text data and an input prompt into a first machine learning (ML) model configured to extract one or more services indicated by the text data; generate a text embedding for each service of the one or more services; and apply a second ML model to (i) the one or more services and (ii) the text embeddings, wherein applying the second ML model includes: clustering the one or more services and the text embeddings into a set of clusters based on similarity values indicating similarities between (i) one or more of the one or more services and (ii) one or more of the text embeddings, and generating, based on the set of clusters, at least one data storage template indicating a standardized set of services in a standardized format for projects with associated project data included in one or more clusters of the set of clusters.

In some aspects, the techniques described herein relate to a tangible machine-readable medium, wherein the instructions, when executed, cause the machine to at least: receive a request corresponding to a new project; apply a third ML model to the request to output a request indication, wherein the third ML model is trained using a plurality of request training data and a plurality of project training data from the sets of project data to output a plurality training request indications; and display the request indication to a user associated with the new project.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
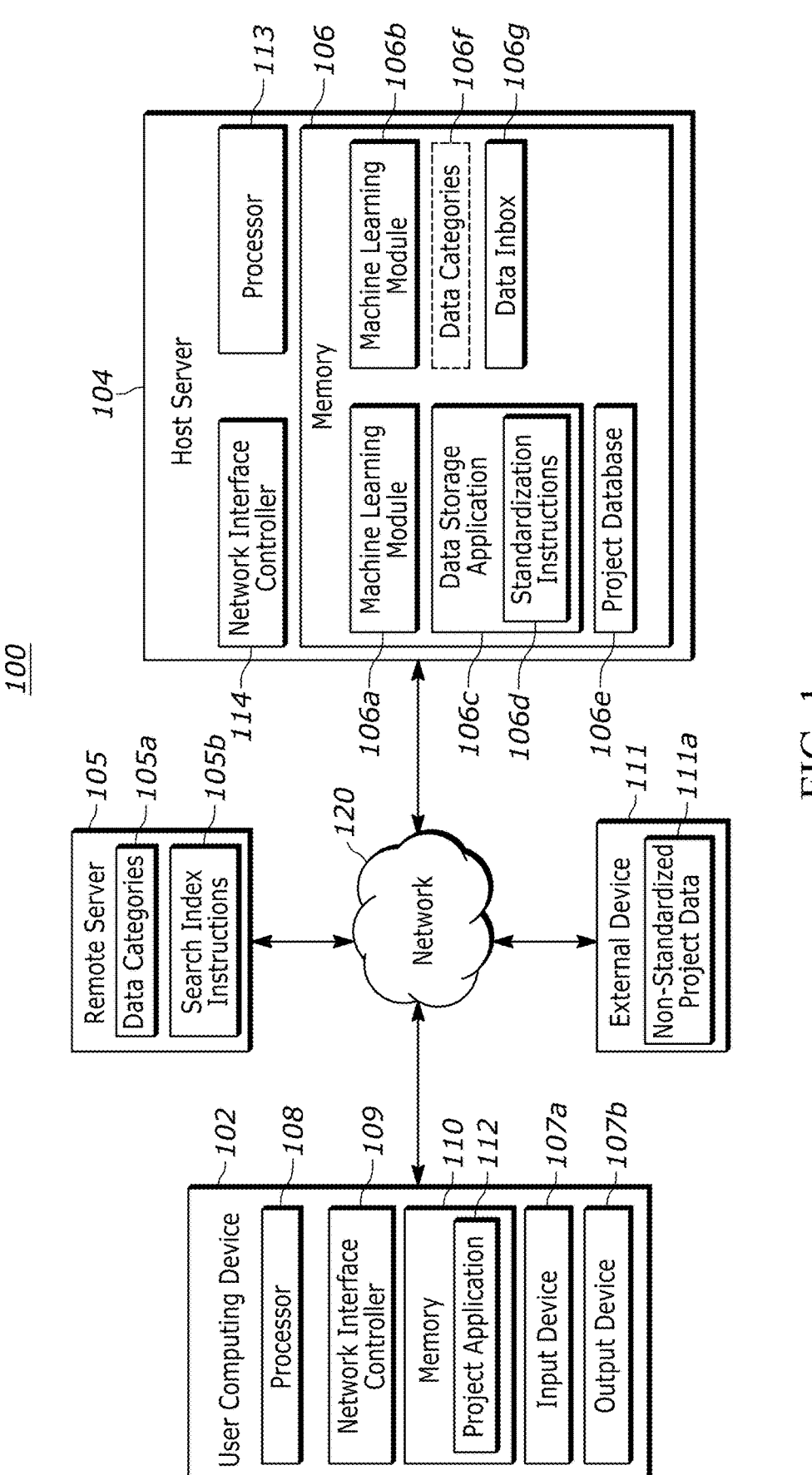
FIG. 1 illustrates an example computing environment for improving project data storage by generating standardized data storage templates, in accordance with various embodiments described herein.

The Figures depict preferred embodiments for purposes of illustration only. Alternative embodiments of the systems and methods illustrated herein may be employed without departing from the principles of the invention described herein. Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

DETAILED DESCRIPTION OF THE INVENTION

Given the complexity and dynamic nature of project management, particularly real estate project management, the integration of advanced technologies such as artificial intelligence (AI) and machine learning (ML) models presents a transformative opportunity to enhance efficiency, accuracy, and decision-making processes.

Generally speaking, the present techniques include the creation and utilization of standardized data storage templates for project data, which are generated based on a comprehensive analysis of stored project data from numerous projects. This process involves the intake of project data (e.g., new contracts), extraction of text data from the data, and inputting this data into multiple sophisticated ML models. These models perform several key functions: extracting services from the text data, clustering the extracted services, and generating corresponding data storage templates. This dynamic and adaptive approach to template generation and data analysis significantly improves the processing capabilities of computer systems involved in project management. By automating the extraction and analysis of project data, the system reduces the computational burden on processors, enabling them to perform more efficiently and handle larger volumes of data without compromising speed or accuracy.

In particular, the present techniques focus on optimizing project data storage through a sophisticated system that leverages machine learning (ML) models to process, standardize, and store project data efficiently. This system, designed to handle project data in various non-standardized formats, employs a series of ML models to extract relevant text data, identify services indicated within the text, and generate text embeddings for these services. The core of these techniques lies in the application of a second ML model that clusters services and their corresponding text embeddings based on similarity values. This clustering process facilitates the generation of data storage templates, which represent standardized sets of services in a standardized format, thereby streamlining the storage of project data for a multitude of projects.

These aspects of the present techniques also overcome the data standardization challenges experienced by conventional techniques. Namely, by extracting text data and services from project data, applying a ML model to the services and text embeddings to create a set of clusters, and generating data storage templates, the present techniques reference and map uniquely categorized data back to standardized categories. When individual participants update project data in a project database, the systems of the present disclosure allow the participants to upload the data in any format used by the participant's local device. The present techniques then extract the non-standardized data, convert the data into a standardized format using the data storage templates, and can push real-time updates to participants and thereby quickly notify them of any changes without having to manually look up or consolidate all project updates. The data storage templates thereby enable real-time updates and alerts to project data for all connected users (e.g., contractors, subcontractors), comprehensive benchmarking, comparison, and analysis across various dimensions such as expected services for a project task, project costs, vendor costs, accounts, projects, asset classes, geo-locations, and/or others, as described herein. This capability allows project participants to receive real-time notice and access to project changes so they can adapt their own service commitment or personnel allocation strategies in accordance with other participant's actions.

These data storage templates also enable project management to perform benchmarking/comparison tasks efficiently and accurately, such as evaluating expected services during project bid management and/or project progression, implementing customized budget line schemas, projecting cash flows, proactively flagging overruns, and/or other tasks typically handled by project management. As a project proceeds, the techniques of the present disclosure enable project management to efficiently update and track the tasks/services that each project participant is expected to perform. For example, a project manager may receive multiple new and/or updated contracts for each participant throughout the course of a project, such that identifying (1) what services are included in each contract, (2) what services should be included in each contract, and (3) what services have been changed in different versions of the contract is challenging with conventional techniques. The present techniques alleviate the issues associated with such challenging contract management (e.g., missing services, erroneous contract changes, unperformed work, lost project time, etc.) by automatically evaluating each received contract to make these determinations. The techniques of the present disclosure therefore facilitate continual project contract analysis to ensure that each received contract includes all relevant services and is consistent with the other contracts included as part of the project, and thereby eliminate the challenges associated with conventional project contract analysis.

Moreover, the present techniques address the prevalent challenge of document standardization in the real estate industry, where records are often maintained in various formats. By ingesting these documents and converting them into a modern form of record-keeping using cloud storage, relational databases, and flexible data formats, the present techniques bridge the gap between traditional document-based practices and contemporary cloud software solutions. This transition not only facilitates backward compatibility with less technologically advanced industry partners but also introduces a level of efficiency and flexibility in generating project reports that was previously unattainable. These technical improvements are acutely pronounced in the present techniques' flexible approach to data extraction using, for example, OCR/data extraction technologies, efficient data storage in a normalized/standardized format, and the generation of a variety of reports with extracted data.

Another significant improvement introduced by the present techniques is the enhancement of processing efficiency. By aggregating project data from multiple projects and standardizing this data into a standardized format, the system reduces the complexity and variability inherent in handling diverse project data. This standardization not only simplifies data processing but also optimizes the use of processing resources, enabling faster and more efficient data handling.

Another notable improvement is the optimization of memory usage. The system's ability to convert project data into a standardized format, as indicated by the generated data storage templates, often results in a reduction of the file size of the stored project data through intelligent condensation, consolidation, and/or other dimension reduction techniques (e.g., compression). For example, the present techniques employ efficient data storage techniques, such as storing data in a JavaScript Object Notation (JSON) format within a database, which minimizes space consumption while maintaining easy access and manipulation of the data. This reduction in file size directly translates to more efficient memory usage, as less storage space is required to house the project data. Furthermore, the system's capacity to store data in a standardized format enhances the organization and retrieval of project data, further contributing to the overall efficiency of memory usage.

Network usage also sees significant enhancements through the application of the present techniques. By employing ML models to process and standardize project data, the system minimizes the need for manual data entry and transfer, thereby reducing the volume of data that needs to be transmitted over a network. This reduction in data transmission not only alleviates network congestion but also speeds up the data storage process. Additionally, the system's ability to generate alerts in real-time for transmission to all entities associated with a project further exemplifies the efficient use of network resources, ensuring timely communication and response to project data that exceeds predefined thresholds.

The present techniques introduce a comprehensive approach to project data storage optimization, leveraging the power of machine learning to process, standardize, and store project data efficiently. By enhancing processing efficiency, optimizing memory usage, and improving network usage, these techniques offer a robust solution to the challenges of handling diverse and voluminous project data. Through the strategic application of ML models and the generation of standardized data storage templates, the system not only streamlines the storage of project data but also facilitates improved project management and decision-making processes.

The present techniques also overcome the bid management challenges experienced by conventional techniques. Namely, the present techniques introduce a robust bid management system that leverages the vendor marketplace to analyze incoming bid data in light of historical bid data and corresponding contracts, budgets, and ultimate budget outcomes. By employing an ML model to evaluate services within the proposed bids and generate recommendations on which bid to accept or how to construct a suitable bid (e.g., services, budgets, timelines), the present techniques enhance network usage by facilitating seamless and intelligent data exchange between different system components. This not only streamlines the bid evaluation process but further optimizes the use of network resources by ensuring that data transmission is both relevant and efficient.

More specifically, the techniques of the present disclosure improve the functionality of a computing device (e.g., a host server) at least by analyzing data in a particular way to enhance the efficiency and capabilities of the computing device. The machine learning models, executing on the computing device, extract services from text data, cluster the services and text embeddings, and generate data storage templates based on the clusters to thereby store/update project data with an efficiency and clarity not achieved using conventional techniques. That is, the present disclosure describes improvements in the functioning of the computer itself because the computing device more efficiently analyzes data as a direct result of the machine learning models analyzing project data. This improves over the prior art at least because existing systems fail to analyze, store, or utilize project data in a standardized manner and/or are otherwise unable to analyze project data with the efficiency resulting from the disclosed machine learning models and corresponding techniques.

That is, the present disclosure describes improvements in the functioning of the computer itself or "any other technology or technical field" because a hosting server or computing device is enhanced with machine learning models. The machine learning models accurately extract data, cluster the data, and generate data storage templates that optimize project data storage by increasing the efficiency of such storage. Namely, the machine learning models extracting/clustering the data and generating data storage templates reduces/eliminates (1) the time and resources required to correct erroneous data classification and metric impacts suffered by conventional techniques and (2) the delays and misallocated resources of project participants resulting from inaccurate or untimely project data updates. The machine learning models therefore improve over the prior art at least because existing systems lack such extracting, clustering, and generating functionality and are generally unable to analyze such non-standardized data to output standardized data storage templates designed to optimize project data storage.

Further, the present disclosure includes improvements to other technologies or technical fields at least because the present disclosure describes or introduces improvements in the field of project data storage/management/analytics. Namely, the trained machine learning models executing on the server or other computing devices (e.g., user computing device) improves the field of project data storage/management/analytics by introducing the capability to predict/standardize data formats and optimize data storage accuracy/efficiency in a manner that was previously unachievable using conventional techniques. This improves over conventional techniques at least because such techniques lack the ability to predict/standardize data formats and are otherwise simply not capable of optimizing data storage accuracy/efficiency.

As mentioned, the model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., 10,000s of training data corresponding to services, text embeddings, data storage templates, project data, standardized data formats, etc.) to output the predicted standardized data templates, classifications, and/or predicted impacts configured to optimize project data storage through optimized data storage accuracy/efficiency (e.g., via standardized data storage templates).

In addition, the present disclosure includes specific features other than what is well-understood, routine, conventional activity in the field, or adding unconventional steps that confine the claim to a particular useful application, e.g., aggregating project data from the sets of project data corresponding to at least two projects of the plurality of projects, the project data being in a non-standardized format; extracting text data from the project data; inputting the text data and an input prompt into a first machine learning (ML) model configured to extract one or more services indicated by the text data; generating a text embedding for each service of the one or more services; and/or applying a second ML model to (i) the one or more services and (ii) the text embeddings, wherein applying the second ML model includes: clustering the one or more services and the text embeddings into a set of clusters based on similarity values indicating similarities between (i) one or more of the one or more services and (ii) one or more of the text embeddings, and/or generating, based on the set of clusters, at least one data storage template indicating a standardized set of services in a standardized format for projects with associated project data included in one or more clusters of the set of clusters, among others.

Example Computing Environments and Architectures

FIG. 1 illustrates an example computing environment 100 for improving project data storage by generating standardized data storage templates, in accordance with various embodiments described herein. The computing environment 100 includes a user computing device 102, a host server 104, a remote server 105, an external device 111, and a network 120. Some embodiments may include a plurality of user computing devices 102, a plurality of host servers 104, a plurality of remote servers 105, and/or a plurality of external devices 111. Generally speaking, the computing environment 100 represents a set of components configured for project management. As an example, the host server 104 may be a device owned or operated by a project manager or other entity responsible for the management of a project (e.g., a real estate project), the user computing device 102 may be a device owned or operated by a project participant (e.g., contractor, subcontractor, etc.) that uploads project data or bids related to a project to the host server 104 and/or requests updated project data from the server 104. In this example, the external device 111 may be an external database owned/operated by the project manager and is used for additional project data storage (e.g., the non-standardized project data 111a), and the remote server 105 may be another server owned/operated by the project manager or otherwise accessible by the project manager (e.g., via host server 104) that stores data categories 105a associated with the project database 106e and/or includes search index instructions 105b. In certain embodiments, the computing environment 100 may not include the external device 111 and/or the remote server 105.

In any event, the user computing device 102 includes a processor 108, a network interface controller 109, and a memory 110. The memory 110 stores a project application 112, which enables the user computing device 102 to access the project database 106e stored on the memory 106 of the host server 104.

The user computing device 102 may also include an input device 107a, and an output device 107b. The input device 107a may include any suitable device or devices for receiving input, such as one or more microphone, one or more camera, a hardware keyboard, a hardware mouse, a capacitive touch screen, etc. The output device 107b may include any suitable device for conveying output, such as a hardware speaker, a computer monitor, a touch screen, etc. In some cases, the input device 107a and the output device 107b may be integrated into a single device, such as a touch screen device that accepts user input and displays output. The user computing device 102 may communicate with the host server 104 and the remote server 105 across the network 120 via the network interface controller 109.

The host server 104 may include a memory 106, a processor 113, and a network interface controller 114. The memory 106 may store a ML module 106a, one or more machine learning models 106b, a data storage application 106c storing standardization instructions 106d, a project database 106e, a set of data categories 106f, and/or a data inbox 106g. In some embodiments, the data storage application 106c may include the machine learning models 106b to perform any/all of the actions described herein as performed by the machine learning models 106b.

Broadly, the host server 104 may execute/access each of the models/modules 106a, 106b, the data storage application 106c, and other stored data/instructions (e.g., 106d, 106e, 106f, 106g) to aggregate project data (e.g., stored in database 106e and/or newly received at data inbox 106g), extract data (e.g., text data) from the project data, extract services from the text data, generate embeddings for the services, cluster the services/embeddings, generate data storage templates based on the clusters, generate real-time updates and/or alerts for transmission to connected users, and/or otherwise provide insights related to the project data input by a user and/or otherwise received at the host server 104. As referenced herein, each of the models/modules 106a-b may be trained with and/or otherwise utilize artificial intelligence (AI) and/or machine learning (ML) techniques, and the data storage application 106c may leverage such AI/ML techniques by executing the ML module 106a and/or the ML model(s) 106b.

For example, the machine learning model 106b may be or include multiple ML models trained to extract services indicated by text data, generate text embeddings, cluster services/embeddings into a set of clusters, generate data storage templates indicating standard sets of services based on the clusters, and/or any other suitable generative, classification, and/or predictive functionalities described herein. The project data and corresponding extracted and/or other associated data, as referenced herein, may generally include any suitable data corresponding to a project (e.g., construction/real-estate project). For example, data received at the data inbox 106g may include invoices, commitments (e.g., contracts), lien waivers, and/or any other suitable data corresponding to the project.

Broadly speaking, the data storage application 106c manages data intake, data storage template creation/management, project data standardization, and project data storage in the project database 106e, which stores sets of project data for a plurality of projects in various standardized formats. As part of these functions, the data storage application 106c extracts text data from received project data (e.g., via an email received at the data inbox 106g) and inputs the text data and an input prompt into a ML model of the ML models 106b configured to extract one or more services indicated by the text data. The data storage application 106c then generates a text embedding for each service of the one or more services using, for example, another ML model of the ML models 106b and/or another set of instructions stored in the memory 106.

Additionally, the data storage application 106c applies another ML model of the ML models 106b to the one or more services and the text embeddings, clustering them into a set of clusters based on similarity values. Based on the set of clusters, the data storage application 106c generates at least one data storage template (e.g., using the standardization instructions 106d) indicating a standardized set of services in a standardized format for projects with associated project data included in one or more clusters of the set of clusters. Using the data storage template, the data storage application 106c converts the project data into a standardized format indicated by the data storage template and stores the standardized project data in the project database 106e. The data storage application 106c may also generate real-time alerts/updates for transmission to all entities associated with the project when certain thresholds are exceeded. Overall, the data storage application 106c optimizes project data storage by, for example, standardizing project data formats and reducing file sizes, thereby improving efficiency and accessibility of the project data.

As mentioned, the data storage application 106c includes standardization instructions 106d that may inform the data storage template (e.g., formatting) applied to project data in response to the clustering performed by the application 106c applying a clustering ML model of the ML models 106b. In certain embodiments, the clustering ML model may be or include a hierarchical clustering model, a centroid-based clustering model, a distribution-based clustering model, a density-based clustering model, a fuzzy clustering model, a constraint-based clustering model, and/or any other suitable type of clustering model or combinations thereof.

For example, the clustering ML model of the ML models 106b may output a predicted cluster for received project data indicating that the project data is likely associated with a first cluster (e.g., a first set of similar embeddings and services). The data storage application 106c may receive this predicted first cluster, access the standardization instructions 106d to determine that a first data storage template corresponds to the first cluster, and may format the extracted data from the project data in accordance with the formatting standards associated with the first data storage template. In some embodiments, the standardization instructions 106d include one or more formatting templates that each correspond with one or more predicted clusters output by the clustering ML model of the ML models 106b.

In some embodiments, the data storage application 106c converts the data to a standardized format by determining one or more data input locations within a file (e.g., a file following the standardized format) associated with each individual data value from the data based on the data type indicated by the predicted cluster. The standardization instructions 106*d* may indicate where specific data values from data with a particular classification should be stored in a file following the standardized format indicated within the corresponding data storage template. By inputting each data value in the specified location within the file, the relevant data values from the data are thereby accessible in the standardized format and the application 106*c* can readily access and utilize the values. Namely, the data storage application 106*c* can reference the standardization instructions 106*d* and/or otherwise leverage the standardized format to quickly access/retrieve the data values without needlessly processing the file to determine where such data values may be, which consequently reduces processing resources required to manage/utilize the data in the project database 106*e*. Further, the project database 106*e* may be a relational database, and the data storage application 106*c* may input the individual data values into the one or more data input locations and store the file in the relational database.

However, in certain instances, the data storage application 106*c* may receive new project data for which no data storage template is previously known. In these instances, the clustering ML model of the ML models 106*b* may generate a new data storage template indicating a standardized set of services for this new project data. In particular, the ML model of the ML models 106*b* may utilize values (e.g., similarity values) determined during clustering to also determine what elements of the project data should be included in the data storage template. For example, the similarity values may be distance values representing numerical distances between vector and/or other numerical/mathematical representations (e.g., text embeddings) and/or the similarity values may be or include percentages or other ratings indicating semantic, syntactic, and/or other suitable linguistic correlations/similarities (e.g., extracted descriptions).

As an example, the data storage application 106*c* may receive new project data and may input 10 extracted descriptions and 10 text embeddings from the new project data into a clustering ML model of the ML models 106*b*. As a result of the clustering performed by the clustering ML model, the new project data may be predicted to be part of a new cluster, e.g., either as the sole member of the new cluster or in combination with other project data that is also not part of any existing cluster. In this example, the clustering ML model may determine that the new project data is included in the new cluster with four other sets of text embeddings and corresponding extracted descriptions. The clustering ML model may determine that the new project data belongs in the new cluster with the four other sets of project data based on strong similarity values between 9 out of 10 extracted descriptions and 9 out of 10 text embeddings.

The clustering ML model may utilize multiple similarity value thresholds that correspond to the different values evaluated for the purposes of clustering. For example, a "strong" similarity value for two extracted descriptions may indicate that the linguistic correlations/similarities between the two descriptions is greater than or equal to 90%. A "strong" similarity value for two text embeddings may indicate that the numerical distance value between the two embeddings is less than or equal to 0.5. To illustrate, a first extracted description from the new project data in the prior example may read "building site landscaping plan," and this description may have a very strong similarity value with the description "construction site landscaping plan" from another set of project data included in the new cluster with the new project data because the two descriptions are both highly semantically similar and highly syntactically similar.

Continuing the above example, the clustering ML model of the ML models 106*b* may generate a new data storage template corresponding to the new cluster based on the similarity values associated with some/all of the project data included in the new cluster. The clustering ML model may, for example, determine that the new data storage template should include standardized portions for data entry corresponding to each of the 9 extracted descriptions and/or data associated with the 9 text embeddings from the new project data that have "strong" similarity values with some/all of the other project data included in the new cluster. In certain embodiments, the clustering ML model may define a portion of the data storage template for certain data within the new project data only when the similarity values corresponding to both the extracted description and the text embeddings associated with that data are above the relevant thresholds.

Further, the clustering ML model may compare the 9 extracted descriptions with the 9 text embeddings to determine a degree of redundancy between/among the strong similarity values. To the extent that any of the 9 extracted descriptions is redundant with any of the 9 text embeddings, the clustering ML model may not allocate an additional storage location/formatting in the new data storage template for the redundant data. As an example, if a first extracted description is associated with a roofing inspection and one of the text embeddings corresponds to the roofing inspection, the clustering ML model will include storage requirements within the new data storage template to store each unique piece of data associated with the roofing inspection only once. Moreover, the clustering ML model may determine redundancies between extracted descriptions and/or between text embeddings to further reduce storage redundancies in the new data storage template.

In some embodiments, the data storage application 106*c* may store received project data in nested tables in the project database 106*e*, as part of a standardized format indicated by a data storage template. For example, the data storage application 106*c* may generate data storage templates that utilize any suitable nesting protocol or structure, such as a PostgreSQL LTREE data module, to create and/or access the nested tables. Each nested table may have a file size that is smaller than the composite file size of the component tables. This file size reduction may be accomplished, for example, by determining compact representations of the data stored therein and storing only unique labels for data included in the different tables.

For example, a first table corresponding to standardized formatting requirements of a first data storage template may have a file size of 5 MB and a second table corresponding to standardized formatting requirements of a second data storage template may have a file size of 11 MB. The first table may include two columns indicating "subcontractors" and "expected services," respectively, and the second table may include two columns indicating "expected services" and "expected time to completion." In this example, the first and second storage templates may indicate that tables corresponding to these standardized formatting requirements can be nested together to create a composite table with a smaller composite file size than the sum of the individual component tables.

Thus, the data storage application 106*c* may nest the first table with the second table to create a third table with a file size of 12 MB, which is 4 MB smaller than the sum of the first/second component tables (e.g., 16 MB). In particular, the third table may include three columns indicating the "subcontractors" from the first table, the "expected services" from the first/second tables, and the "expected time to completion" from the second table. In other words, the data storage application 106*c* may condense the first/second tables into the third table by determining/identifying that the "expected services" data is shared between both tables, and can thereby be recited only once in the third table to reduce the resulting table file size and eliminate data redundancy. The data storage application 106*c* therefore utilizes efficient data path representations to condense the two tables (first/second table) into a smaller, single table (third table) that includes all the relevant data from both tables.

In certain embodiments, the data storage application 106*c* may utilize efficient data labeling to minimize file sizes. For example, the application 106*c* may analyze a first project data update and may label and organize the data in accordance with a first standardized data storage template corresponding to a first cluster to which the first project data update belongs.

This first standardized data storage template may cause the application 106*c* to format data in file paths represented by short text strings separated by periods (e.g., "aaa.aaa"), hyphens (e.g., "aaa-aaa"), underscores (e.g., "aaa_aaa"), colons (e.g., "aaa:aaa"), and/or any other suitable character(s) or combinations thereof. The text strings in the various positions may correspond with labels of certain hierarchical values and may thus represent paths to data represented later in the file path. The data storage application 106*c* may label and organize data in disparate tables in accordance with this first standardized data storage template, condense the data in those disparate tables into a single table that utilizes the file paths as column/row headings, and then leverage such hierarchical file paths to only store unique data labels that are more specific than the file path prefixes composing the column/row headings. In this manner, the data storage application 106*c* creates and implements an efficient standardized data format template that ensures minimal data redundancy and overall file sizes to improve the data storage capabilities of the systems described herein.

The data inbox 106*g* is generally an email inbox configured to receive, store (e.g., temporarily), and display received data that is routed to the address of the inbox 106*g*. The data inbox 106*g* is illustrated as hosted on the host server 104, and the inbox 106*g* may be accessible by and displayed at the user computing device 102 for viewing by the user. Further, in certain embodiments, the data inbox 106*g* accesses received inputs via a listener interface configured to automatically retrieve and process the received inputs in real-time. More specifically, the data inbox 106*g* may receive updated project data (e.g., a bid that includes a contract proposal), and the data storage application 106*c* may execute the machine learning models 106*b* and/or otherwise evaluate the updated project data to determine and/or generate a suitable data storage template for the updated project data. In this manner, these embodiments enable the host server 104 to provide users with real-time updates, messages, alerts, and/or any other data related to their corresponding project(s). Of course, it should be appreciated that the data inbox 106*g* may store inputs (e.g., email messages) including any suitable data (e.g., text data, image data, video data, audio data, etc.)

The data storage application 106*c* may automatically extract non-standardized data from a document and/or other file that is sent to the data inbox 106*g* so that users of the host server 104 do not perform any data entry. Once the data storage application 106*c* extracts the non-standardized data, the application 106*c* may determine and/or generate a data storage template that is optimally configured to store the non-standardized data. The data storage application 106*c* may determine a predicted cluster for the data which may correspond to a data storage template and/or may cause the application 106*c* to generate a new data storage template because the data does not belong to a currently existing cluster.

For example, the data inbox 106*g* connected to the data storage application 106*c* may receive an email message indicating a bid that includes a proposed contract for services associated with a project in a non-standardized format. The data storage application 106*c* may analyze the proposed contract, extract services indicated in the proposed contract, compare those services with the anticipated services indicated by a data storage template, and may output an updated/revised contract indicating differences between the proposed contract and the type, number, and/or quantities associated with services included in the data storage template. The data storage application 106*c* may also take this project data from the non-standardized proposed contract, automatically generate a standardized document that includes the project data in a standardized format/schema based on the data storage template and store this standardized document in the project database 106*e* and/or a relational database (not shown) stored therein. Thus, the data storage application 106*c* may take data from the data inbox 106*g* that is formatted in any manner the transmitting entity chooses and may normalize that data in the project database 106*e* to present a uniform experience for users (e.g., project managers, etc.) accessing the host server 104 to manage any number of projects and/or vendors.

The data storage application 106*c* may also generate alerts for transmission to any entity connected to the host server 104 (e.g., via the data inbox 106*g*) indicating relevant updates to the project data. For example, an entity associated with the external device 111 may cause the device 111 to transmit non-standardized project data 111*a* to the host server 104 indicating a first contract for a particular service as part of a first project with data stored within the project database 106*e*. The data storage application 106*c* may receive the data 111*a*, evaluate the data for standardization and storage, and determine that the first contract for a first set of services represented by the data 111*a* is a more acceptable contract than a second contract for the first set of services already stored in the project database 106*e*. Namely, in this example, the first contract may be from a first signage subcontractor that proposes to complete the first set of services (e.g., related to signage) at a first price (e.g., $1000) and within a first timeframe (e.g., one week), and the second contract may be from a second signage subcontractor that proposes to complete the first set of services at a second price (e.g., $1500) and within a second timeframe (e.g., two weeks). The data storage application 106*c* may determine that the first contract is more acceptable than the second contract because the first price and the first timeframe are more consistent with the first project budget and overall timeframe than the second price and the second timeframe, respectively. Accordingly, the data storage application 106*c* may thereafter generate an alert for connected entities (e.g., project management approving entities) indicating the differences between the first and second contracts and/or the standardized data stored within the project database 106*e* associated with one or both contracts.

In some embodiments, the data storage application 106*c* and/or the ML models 106*b* (and/or other models described herein) may extract data (e.g., text data) from the project data by utilizing at least one of: (i) optical character recognition (OCR), (ii) image recognition, (iii) object recognition, and/or (iv) image extrapolation. As an example, the data storage application 106c may analyze a new bid contract received at the data inbox 106g by utilizing OCR to determine that the new bid contract includes a first set of characters indicating a first service and a second set of characters indicating a second service. For example, the new bid contract may be associated with a landscape consultant, the first service may be assessments related to a rooftop, and the second service may be assessments related to a building site. The data storage application 106c may extract (via OCR) the first/second set of characters and may subsequently input the characters and a prompt into the ML model 106b to generate a list of services indicating the first/second set of characters. The ML model 106b (e.g., a generative language model) may thereafter output the list of services and/or relevant facts associated with each service. Continuing the prior example, the ML model 106b may generate a list of services that includes assessments related to the rooftop and the building site, and may further include data indicating that (1) the rooftop assessments are quoted at $300 and will take 2 days to complete and (2) the building site assessments are quoted at $400 and will take 3 days to complete, as extracted from the new bid contract.

In some embodiments, the data storage application 106c may utilize OCR in conjunction with the ML model 106b to identify specific locations within documents/files and correlate/associate the extracted/identified data from a particular document to known areas/fields of standardized document templates. Using this OCR analysis and field matching, the data storage application 106c and/or other suitable model(s) described herein may generate standardized templates for document/file types by determining and saving/storing templates based on a shared set of areas/fields common to a particular document(s)/file(s).

In certain embodiments, the data storage application 106c transmits alerts/messages for users connected to the host server 104 in real-time indicating the received project data. As a simple example, in a first project, three separate subcontractors are scheduled to work independently in succession to accomplish conducting an environmental impact survey, preparing a building site, and laying a building foundation and constructing a building interior support structure. In other words, in this example, the first subcontractor is scheduled to work on working days one and two, the second subcontractor is scheduled to work on working days three through five and can only after the first subcontractor is finished, and the third subcontractor is scheduled to work on working days six through ten and can only work only after the first and second subcontractors are finished. The first subcontractor may work the first two days and experience delays causing the environmental impact survey to take an additional two days (e.g., through working days three and four).

Accordingly, the first subcontractor may upload project data to the host server 104 (e.g., at the data inbox 106g) indicating that the new timeline to complete their work includes working days one through four. This adjusted timeline impacts both the second and third subcontractors, as they are unable to begin working until the first subcontractor completes the survey. The data storage application 106c may analyze this updated project data from the data inbox 106g to determine that the updated project data corresponds to an updated subcontractor timeline, and may reformat the project data into a standardized format based on the output of the ML model 106b, and may generate/transmit a message in real-time to the second/third subcontractors (e.g., via the data inbox 106g) indicating that the updated project data exceeds a threshold (e.g., a timing threshold) related to the first project. In this manner, the second/third subcontractors receive real-time updates related to the first project without constantly monitoring the inbox 106g and are thereby able to quickly and accurately reallocate resources (e.g., working personnel, materials, equipment) as necessary to account for their impacted timelines associated with the first project.

In some embodiments, the data storage application 106c may utilize parallel processing to expedite certain processes described herein. For example, the data inbox 106g may receive two inputs simultaneously or nearly simultaneously. In this example, the data storage application 106c may execute one or more ML models 106b and/or other instructions to extract/cluster the data from both inputs in parallel utilizing parallel processing. The application 106c may also convert both sets of project data to one or more standardized formats based on the resulting clusters associated with the project data in parallel utilizing parallel processing. As part of this parallel processing, the data storage application 106c may also generate multiple new data storage templates to store the received project data in a standardized format in parallel utilizing parallel processing. Moreover, the application 106c may store both sets of standardized data in the project database 106e in parallel utilizing parallel processing and generate indications of both sets of data for display to the user as part of the data inbox 106g in parallel utilizing parallel processing.

The project database 106e may be stored on the host server 104 and/or may be stored in a remote location (not shown), such as the remote server 105. Generally, the remote server 105 may include a set of data categories 105a and a set of search index instructions 105b. The set of data categories 105a may include any suitable number of different data categories that may be relevant to any particular project, set of projects, and/or industry/industries. The set of data categories 105a may also be similar/identical to the set of data categories 106f that may be stored in the memory 106 of the host server 104.

The set of search index instructions 105b may be or include instructions configured to cause the remote server 105 to search through the set of data categories 105a to return probable/likely data category mappings for any input data categories. For example, the host server 104 may receive an input from a user (e.g., via user computing device 102) indicating the data category "Project Software and Applications", and the host server 104 may format an input query (e.g., via the trained ML model 106b) that is transmitted to the remote server 105 via the network interface controller 114. For example, the trained ML model 106b may be or include a large language model (LLM) configured to receive input data categories from a user, semantically/syntactically analyze the input data categories, and format an input query for transmission to the remote server 105 to query the set of data categories 105a.

Upon receipt of the input query, the set of search index instructions 105b may cause the remote server 105 to search the set of data categories 105a for normalized data categories that may correspond to the "Project Software and Applications" data category provided by the user. The set of search index instructions 105b may cause the remote server 105 to return a listing of normalized data categories that may correspond to the "Project Software and Applications" data category, and this listing may provide a ranking of each normalized data category and/or an indication of a confidence value/score for each normalized data category included as part of the listing. The listing may include, for example, "General Administrative & Overhead" as a first potential normalized category with a 95% confidence level/value, "Marketing" as a second potential normalized category with a 50% confidence level/value, and "Legal Services" as a third potential normalized category with a 15% confidence level/value.

The remote server 105 may return this listing to the host server 104, where the trained ML model 106*b* may evaluate the listing and determine a cluster or set of clusters in which the received project data likely corresponds. For example, the remote server 105 may return a listing indicating that a new project data set likely corresponds to a data category of "Project Signage-Temporary," and the ML models 106*b* may utilize this data category to cluster the new project data (e.g., services extracted therefrom and/or corresponding text embeddings) into a first cluster associated with a first data storage template for temporary project signage. Thus, in certain embodiments, the host server 104 may transmit data to a remote server 105 for processing as part of the actions described herein. More specifically, in some embodiments, the remote server 105 may be or be part of a cloud processing architecture, and the host server 104 may transmit input queries including data categories and/or other data for processing by the cloud processing architecture, of which the remote server 105 is a part. However, in certain aspects, the remote server 105 may be part of the host server 104 and/or the user computing device 102.

In certain embodiments, the memories 110, 106 may store instructions that cause the processors 108 and/or the processors 113 to render a graphical user interfaces (GUIs) configured to display data stored in standardized formats as part of the project database 106*e*. For example, the project application 112 stored in the memory 110 of the user computing device 102 may include instructions to render the GUIs in response to receiving updates to the project database 106*e*, such as new data clusters, new data storage templates, updated storage templates, standardized project data, and/or other data stored in the project database 106*e* and/or the data inbox 106*g* or combinations thereof.

More broadly, each of the modules stored in memory 106 implement specific functionality in order to improve project data storage through standardized data storage template generation. For example, the ML module 106*a* includes computer-executable instructions for training and operating one or more ML model. In general, the ML module 106*a* may train one or more ML models (e.g., ML model 106*b*) by establishing a network architecture, or topology, and adding layers that may be associated with one or more activation functions (e.g., a rectified linear unit, softmax, etc.), loss functions and/or optimization functions. As an example, one or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples.

Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction. In certain embodiments, a Bayesian model may be used to train the ML model 106*b*.

In some embodiments, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

Further, in certain embodiments, the ML module 106*a* may train the ML model 106*b* to employ supervised learning, which involves identifying patterns in existing data to make predictions about subsequently received data. Specifically, the ML model 106*b* may be "trained" using training data, which includes example inputs and associated example outputs. Based upon the training data, the ML model 106*b* may generate a predictive function which maps outputs to inputs and may utilize the predictive function to generate machine learning outputs based upon data inputs. The exemplary inputs and exemplary outputs of the training data may include any of the data inputs or machine learning outputs, as described herein. In the exemplary embodiment, a processing element may be trained by providing it with a large sample of data with known characteristics or features.

In another embodiment, the ML model 106*b* may employ unsupervised learning, which involves finding meaningful relationships in unorganized data. Unlike supervised learning, unsupervised learning does not involve user-initiated training based upon example inputs with associated outputs. Rather, in unsupervised learning, the ML model 106*b* may organize unlabeled data according to a relationship determined by at least one machine learning method/algorithm employed by the ML model 106*b*. Unorganized data may include any combination of data inputs and/or machine learning outputs, as described herein.

In yet another embodiment, the ML module 106*a* may train the ML model 106*b* to employ reinforcement learning, which involves optimizing outputs based upon feedback from a reward signal. Specifically, the ML model 106*b* may receive a user-defined reward signal definition, receive a data input, utilize a decision-making model to generate a machine learning output based upon the data input, receive a reward signal based upon the reward signal definition and the machine learning output, and alter the decision-making model so as to receive a stronger reward signal for subsequently generated machine learning outputs. Other types of machine learning may also be employed, including deep or combined learning techniques.

As an example, the ML model 106b may employ natural language processing (NLP) functions, which generally involves understanding verbal/written communications and generating responses to such communications. The ML model 106b may be trained to perform such NLP functionality using a symbolic method, machine learning models, and/or any other suitable training method. As an example, the ML model 106b may be trained to perform at least two techniques that may enable the ML model 106b to understand words spoken/written by a user: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (PoS) tagging, parsing, lemmatization and stemming, stop-word removal, and/or any other suitable sub-task or combinations thereof. For example, using syntactic analysis, the ML model 106b may generate textual transcriptions from verbal responses from a user in a data stream.

Semantic analysis generally involves analyzing text in order to understand and/or otherwise capture the meaning of the text. In particular, the ML model 106b applying semantic analysis may study the meaning of each individual word contained in a textual transcription in a process known as lexical semantics. Using these individual meanings, the ML model 106b may then examine various combinations of words included in the sentences of a textual transcription or a received document (e.g., via data inbox 106g) to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the ML model 106b may generate one or more intent interpretations based upon a textual transcriptions or analyzed document from a syntactic analysis.

In some embodiments, the ML module 106a may train the ML model 106b as a generative AI model (also referenced as generative ML models). Data input into such a generative AI/ML model may include standardized data formats, data classifications, data impacts, data categories, data category mappings, normalized data categories, and other data. The data input into the generative AI/ML model may include text, documents, and images, such as text, documents and images related to project data, standardized data storage formats/templates, data classifications, data impacts, data categories, normalized data categories, data category mappings, and other data. In certain embodiments, a generative AI/ML model may be or include a ChatGPT model. The generative AI/ML model may also employ supervised or unsupervised machine learning techniques, which may be followed by, and/or used in conjunction with, reinforced or reinforcement learning techniques. The generative AI/ML model may also generate audible or verbal output, text or textual output, visual or graphical output, output for use with speakers and/or display screens, and/or other types of output for user and/or other computer or bot consumption.

After training, ML programs (or information generated by such ML programs) may be used to evaluate additional data. Such data may be and/or may be related to standardized data storage formats/templates, data classifications, data impacts, and/or other project data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. Further, it should be appreciated that, as previously mentioned, the ML model 106b may be used to extract text data from project data, extract services from text data, generate text embeddings, cluster services and text embeddings, generate data storage templates, generate alerts, manage bid processes, and/or perform any other functions or combinations thereof using artificial intelligence or, in alternative aspects, without using artificial intelligence.

Moreover, although the methods described elsewhere herein may not directly mention ML techniques, such methods may be read to include such ML for any determination or processing of data that may be accomplished using such techniques. For example, any of the ML model 106b and/or any other models, modules, and/or other software described herein may be trained to use, and may actively employ, any of the ML techniques described herein. In some aspects, such ML techniques may be implemented automatically upon occurrence of certain events or upon certain conditions being met. In any event, use of ML techniques, as described herein, may begin with training a ML program, or such techniques may begin with a previously trained ML program.

Referring again to FIG. 1, each of the user computing device 102, the host server 104, the remote server 105, and/or the external device 111 may be individual computing devices, a group of multiple computing devices, an individual server, a group (e.g., cluster) of multiple servers, and/or another suitable type of computing device or system (e.g., a collection of computing resources). In some aspects, one or more components of the user computing device 102, the host server 104, the remote server 105, and/or the external device 111 may be embodied by one or more virtual instances (e.g., a cloud-based virtualization service). In such cases, the one or more user computing devices 102, the one or more host servers 104, the one or more remote servers 105, and/or the one or more external devices 111 may be included in a remote data center (e.g., a cloud computing environment, a public cloud, a private cloud, etc.).

However, regardless of the specific implementation of the user computing device 102, the host server 104, the remote server 105, and/or the external device 111 a user may utilize the user computing device 102 to access the host server 104, the remote server 105, and/or the external device 111 in order to access the data stored therein (e.g., 105a-b, 106a-g, 111a). In this manner, the user computing device 102 may retrieve and/or otherwise access the data required to improve project data storage.

In any event, as previously mentioned, the user computing device 102 and the host server 104 include processors 108, 113 and network interface controllers 109, 114. The processors 108, 113 may include any suitable number of processors and/or processor types, such as CPUs and one or more graphics processing units (GPUs). Generally, the processors 108, 113 are configured to execute software instructions stored in the memories 110, 106, such as the project application 112, the ML module 106a, the ML model 106b, the data storage application 106c, and/or other instructions. More generally, the processors 108, 113 may be connected to the memories 110, 106 via a computer bus responsible for transmitting electronic data, data packets, or otherwise electronic signals to and from the processors 108, 113 and the memories 110, 106 in order to implement or perform the machine readable instructions, methods, processes, elements or limitations, as illustrated, depicted, or described for the various flowcharts, illustrations, diagrams, figures, and/or other disclosure herein.

The processors 108, 113 may interface with the memories 110, 106 via the computer bus to execute an operating system (OS). The processors 108, 113 may also interface with the memories 110, 106 via the computer bus to create, read, update, delete, or otherwise access or interact with the data stored in the memories 110, 106. The data stored in the memories 110, 106 may include all or part of any of the data or information described herein, and/or any other data stored in the memories 110, 106.

The memories 110, 106 may include one or more persistent memories (e.g., a hard drive/solid state memory) and may store one or more set of computer executable instructions/modules. In general, a computer program or computer based product, application, or code (e.g., the ML module 106a and other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processors 108, 113 (e.g., working in connection with the data in the memories 110, 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The memories 110, 106 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the memories 110, 106 may store an operating system (OS) (e.g., Microsoft Windows, Linux, Unix, etc.) capable of facilitating the functionalities, applications, methods, or other software as discussed herein.

The memories 110, 106 may also store any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the various applications/modules/models described herein, where each may be configured to facilitate their various functionalities discussed herein. It should be appreciated that one or more other applications may be envisioned and that are executed by the processors 108, 113.

The network interface controllers 109, 114 may include any suitable network interface controller(s), such as wired/wireless controllers (e.g., Ethernet controllers), and facilitate bidirectional/multiplexed networking over the network 120 between the user computing device 102 and other components of the environment 100 (e.g., the host server 104, the remote server 105, the external device 111, etc.). The network 120 may be a single communication network or may include multiple communication networks of one or more types (e.g., one or more wired and/or wireless local area networks (LANs), and/or one or more wired and/or wireless wide area networks (WANs) such as the Internet). The network 120 may enable bidirectional communication between the host server 104, the user computing device 102, the remote server 105, the external device 111, and/or between multiple user computing devices 102, for example. According to some embodiments, the user computing device 102, the host server 104, the remote server 105, and/or the external device 111 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network.

In some embodiments, the user computing device 102, the host server 104, the remote server 105, and/or the external device 111 may include a client-server platform technology such as ASP. NET, Java J2EE, Ruby on Rails, Node.js, a web service or online API, responsive for receiving and responding to electronic requests. The user computing device 102, the host server 104, the remote server 105, and/or the external device 111 may implement the client-server platform technology that may interact, via the computer bus, with the memories 110, 106 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

The user computing device 102, the host server 104, the remote server 105, and/or the external device 111 may further include or implement an operator interface configured to present information to an administrator or operator and/or receive inputs from the administrator or operator. For example, an operator interface may provide a display screen (e.g., via input device 107a or output device 107b). The user computing device 102, the host server 104, the remote server 105, and/or the external device 111 may also provide I/O components (e.g., ports, capacitive or resistive touch sensitive input panels, keys, buttons, lights, LEDs), which may be directly accessible via or attached to the user computing device 102, the host server 104, the remote server 105, and/or the external device 111 or may be indirectly accessible via or attached to an internal user computing device. According to some embodiments, an administrator or operator may access the host server 104 and/or the remote server 105 by the user computing device 102 to review information (e.g., project data updates, standardized data storage templates, etc.), make changes, input data categories, and/or perform other functions.

As described above herein, in some embodiments, the user computing device 102, the host server 104, the remote server 105, and/or the external device 111 may perform the functionalities as discussed herein as part of a "cloud" network or may otherwise communicate with other hardware or software components within the cloud to send, retrieve, or otherwise analyze data or information described herein.

Figure 2A:
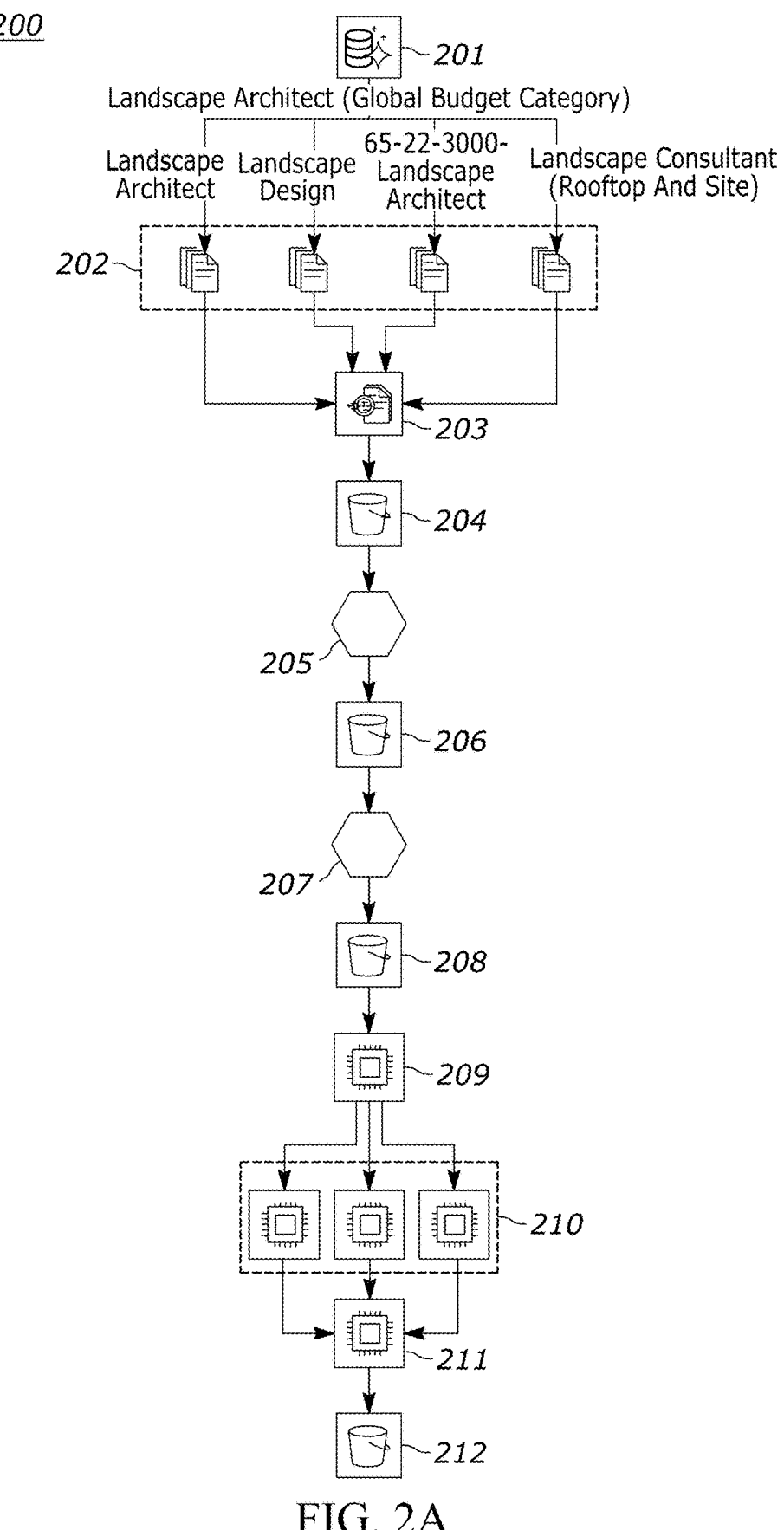
FIG. 2A illustrates an example standardized data storage template generation sequence utilizing various portions of the example computing environment of FIG. 1, in accordance with various embodiments described herein.

FIG. 2A illustrates an example standardized data storage template generation sequence 200 utilizing various portions of the example computing environment 100 of FIG. 1, in accordance with various embodiments described herein. Generally speaking, the sequence 200 includes various functions/actions that may be performed by, for example, the data storage application 106c of the example computing environment 100. These various functions/actions include extracting text data from received project data, generating a set of services and text embeddings based on that project data, clustering the services and embeddings, and generating/storing a data storage template for the project data.

Initially, the standardized data storage template generation sequence 200 includes receiving project data, storing the project data in application data storage 201 (e.g., project database 106e), and retrieving that data from application data storage 201. The sequence 200 includes identifying all project data associated with a relevant data category (block 202). These data categories may generally reflect project tasks, task types, participant types, etc. As illustrated in FIG. 2A, the data category may be associated with a "Landscape Architect," and the identified data may include all contracts associated with landscape architects. For example, a first contract in block 202 may be associated with landscape design and a second contract of block 202 may be associated with landscape consultants performing rooftop and site inspections. Generally, because the project data identification is tied to a relevant data category, correlating the documents across projects may be readily facilitated by a ML model (e.g., a standardized data category AI model of the ML models 106b).

The standardized data storage template generation sequence 200 further includes extracting raw text from the collected project data (block 203) and saving the raw text in a storage location (block 204). In certain embodiments, the project data at block 202 may comprise or include .pdf documents, and block 2034 may include performing OCR on the .pdf documents to extract the text data included therein. In some embodiments, the extracted raw text data may be stored locally on a host server (e.g., host server 104) and/or may be stored in a remote location(s) or service(s), such as the Amazon Simple Storage Service (S3) and/or any other suitable storage location(s) or combinations thereof.

The standardized data storage template generation sequence 200 further includes inputting the raw text data into a ML model with an input prompt to extract a set of services indicated by the raw text data (block 205). The sequence 200 then includes saving the set of services for each project data (e.g., individual contract) into the storage location (block 206). In certain embodiments, the ML model(s) used to extract the set of services are or include a generative AI model, such as a ChatGPT model or similar model(s). Further, the data storage application 106c may provide a predetermined input prompt to the ML model to generate the set of services and/or may generate a custom input prompt (e.g., via a ML model of the ML models 106b) based on the extracted raw text data and/or the relevant data category associated with the raw text data. The set of services is a compact form of the relevant data included in the project data, and thereby reduces the demand on processing resources required to generate the data storage template at subsequent steps/blocks of the standardized data storage template generation sequence 200. Moreover, in certain embodiments, the set of services may be or include a generalized "scope of work" or other summarization statement that broadly characterizes the relevant data from the extracted raw text data.

The standardized data storage template generation sequence 200 further includes generating a text embedding for each service using an AI/ML model (block 207). As mentioned, the text embedding is a numerical representation of the set of services. These numerical representations (embeddings) are then saved alongside the set of services in the data storage location (block 208). The AI/ML model(s) used to generate these text embeddings are generally not generative ML models (e.g., Bidirectional Encoder Representations from Transformers (BERT), Recurrent Neural Networks (RNNs)). In certain embodiments, the ML model(s) used to generate the text embeddings are or include a generative AI model, such as a large language model (LLM) or other suitable models (e.g., a ChatGPT model or similar model(s)).

The standardized data storage template generation sequence 200 further includes inputting all text embeddings and sets of services into a clustering model (block 209). Generally speaking, the clustering model is a ML model utilizing one or more of the clustering algorithms described herein. As a result of the clustering model clustering the input data, the clustering model creates a set of clusters 210 that each include one or more sets of text embeddings and/or sets of services. For example, a first cluster may include data associated with multiple contracts that all relate to landscape design and a second cluster may include data associated with multiple contracts that all relate to landscape consultancy. With the set of clusters, the clustering model may then determine the clusters that are the most popular and determine a title/name for each popular cluster (block 211). Clusters may be popular if they include a threshold number of data entries (e.g., the cluster is a certain size), satisfy certain similarity value thresholds (e.g., data included in the cluster is most strongly correlated), and/or based on any other suitable metric or combinations thereof.

In this manner, the clustering model may generate data storage templates for project data by determining which specific sets of services and/or text embeddings are most likely to represent standardized services and/or text data that should be included in project data related to a known data category. For example, both a first cluster and a second cluster may include project data generally related to landscape architects, but the first cluster may include different sets of services and/or text embeddings than the second cluster. In this example, the clustering model may determine that the first cluster is more popular than the second cluster based on any suitable metric (e.g., cluster size, similarity values, etc.), such that the first cluster is more likely to include or represent standard services or services that should be expected in a contract associated with a landscape architect. Accordingly, the clustering model may generate a title/name for the first cluster (e.g., "Landscape Architect") and may generate/indicate that the set of services, the text embeddings, and/or any additional data included therein or generated as a result of the clustering may be or be included as part of the data storage template associated with the first cluster.

When the clustering model determines the most popular clusters, the standardized data storage template generation sequence 200 may further include saving a data storage template of a standardized set of services for the popular cluster(s) (block 212).

Figure 2B:
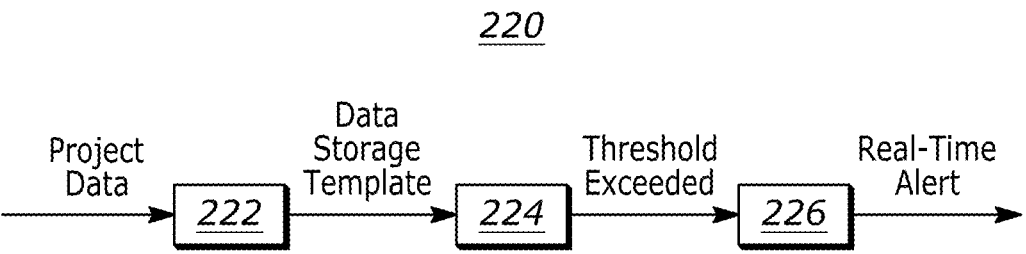
FIG. 2B illustrates an example new project data and real-time alert workflow, in accordance with various embodiments described herein.

FIG. 2B illustrates an example new project data and real-time alert workflow 220, in accordance with various embodiments described herein. Generally speaking, the example new project data and real-time alert workflow 220 may utilize any of the processing and/or other components of the various embodiments described herein. For example, the example new project data and real-time alert workflow 220 may utilize the processors 113, the data storage application 106c, and the ML models 106b of the host server 104 in FIG. 1.

The example new project data and real-time alert workflow 220 includes receiving new project data and evaluating the data to determine a data storage template (block 222). As previously mentioned, determining a data storage template may include generating a new data storage template and/or accessing or utilizing a previously created data storage template. In either case, block 222 includes extracting text data from the project data and inputting the text data and an input prompt into a ML model configured to extract one or more services indicated by the text data. Block 222 further includes generating a text embedding for each service of the one or more services and applying another ML model to (i) the one or more services and (ii) the text embeddings to cluster the one or more services and the text embeddings into a set of clusters based on similarity values indicating similarities between (i) one or more of the one or more services and (ii) one or more of the text embeddings. Block 222 further includes generating and/or retrieving/accessing the data storage template corresponding to the relevant data cluster(s) and formatting the new project data in accordance with the standardized format indicated by the data storage template.

The example new project data and real-time alert workflow 220 further includes evaluating the new project data to determine whether any project thresholds have been exceeded/violated (block 224). As previously mentioned, each project may have unique project thresholds corresponding to each data category and/or that reference aggregate values for the project. Of course, it should be appreciated that a project may have any suitable number of thresholds associated with any suitable number of data categories or other data associated with the project.

For example, a first project threshold may correspond to a total project budget and a second project threshold may correspond to time periods allocated for work associated with landscaping. In this example, the new project data may include an invoice for work performed in association with landscaping for a project. At block 224, the example new project data and real-time alert workflow 220 includes analyzing this data in a standardized format, as specified by the relevant data storage template determined for the data at block 222, to determine whether the data exceeds either the first or the second threshold values. The data may indicate that the landscaping work (1) exceeded the original budget for the landscaping data category, (2) exceeded the time period allocated to complete the work, and (3) exceeded the total budget for the project. Accordingly, the systems described herein may determine that one or more real-time alerts should be provided to authorized participants of the project based on the multiple exceeded thresholds.

At block 226, the example new project data and real-time alert workflow 220 includes generating one or more real-time alerts based on the exceeded thresholds. Generally, the real-time alerts may be provided to connected users of the systems described herein (e.g., users of user computing devices 102) via any suitable communication interface, such as email (e.g., through data inbox 106g), text message, phone call, and/or any other suitable communications or combinations thereof. Each of the real-time alerts/updates may be provided utilizing the standardized data (e.g., formatted based on the data storage template(s)) and/or may be formatted to account for the preferred communication media through which the participant prefers to receive alerts/updates.

Continuing the prior example, the project may have 3 participant entities that should receive alerts/updates corresponding to the three violated thresholds (e.g., landscaping/total budget, and landscaping time period). The first participant entity may be a project management entity who is designated to receive updates/alerts related to the project budget, and the second/third participant entities may be subcontractors who were scheduled to perform work related to the project after the landscaping contractor who submitted the invoice. The workflow 220 may include transmitting two real-time alerts/updates to the first participant entity indicating that both the landscaping budget and the total project budget are currently exceeded and may provide suggestions/recommendations concerning how to alleviate these issues.

The workflow 220 may further include transmitting a real-time alert/update to both the second participant entity and the third participant entity indicating that their allocated/scheduled times to perform their services relative to the project have been impacted. The real-time alert/update may include suggestions/recommendations indicating how the second/third entities may re-allocate their resources to alleviate the negative impacts stemming from the interrupted work schedules. For example, the real-time alert to the second participant entity may suggest that the entity re-schedule workers to perform the required services on a subsequent set of days/times, and the real-time alert to the third participant entity may suggest that they re-schedule delivery of their required materials to the worksite and increase their overall worker count on the project to account for the reduced amount of time to complete their services.

Figure 2C:
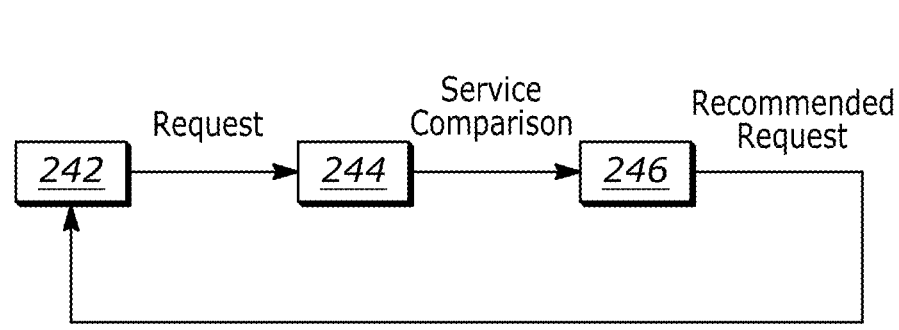
FIG. 2C illustrates an example request processing workflow leveraging data stored using one or more standardized data storage templates, in accordance with various embodiments described herein.

FIG. 2C illustrates an example request processing workflow 240 leveraging data stored using one or more standardized data storage templates, in accordance with various embodiments described herein. Generally speaking, the example request processing workflow 240 may utilize any of the processing and/or other components of the various embodiments described herein. For example, the example request processing workflow 240 may utilize the processors 113, the data storage application 106c, and the ML models 106b of the host server 104 in FIG. 1.

The example request processing workflow 240 includes a first participant entity transmitting a request to a second participant entity (block 242). This request may be or include, for example, a proposed contract for performing services related to a project, and the proposed contract may include one or more listed and/or otherwise indicated services. At block 244, the second participant entity receives the request and the systems described herein process the request to extract and standardize the data contained therein in accordance with one or more generated/accessed data storage templates. With the standardized data, block 244 further includes comparing the listed/indicated services with a known or expected set of services indicated in the generated/accessed data storage templates. In the event that the services listed/indicated in the received request do not match the known or expected set of services indicated in the generated/accessed data storage templates, the workflow 240 includes adjusting the request or generating a new (i.e., recommended) request that includes such services (block 246). The example request processing workflow 240 includes transmitting the recommended request to the first participant entity to potentially continue the request adjustment/refinement process broadly described by the workflow 240.

For example, the first participant entity may transmit a request to provide paving services for a project and may include services associated with milling the prior paved surface and applying a new layer of asphalt pavement. The systems described herein may receive this request and analyze the services listed/indicated therein (e.g., block 244) to determine that the request does not include an expected service corresponding to applying a tack mixture to the milled surface prior to applying the new layer of asphalt pavement. Accordingly, the systems described herein may adjust the request (e.g., block 246) to include the tack mixture application services and may adjust other related characteristics that depend on the listing of services (e.g., projected timeline to completion, projected budget, workforce allocation, etc.). The systems described herein may then transmit this adjusted/recommended request back to the first participant entity for consideration. This process may continue iteratively until the request is accepted or rejected by the first/second participant entities.

Example Project Data Standardization Sequences

Figure 3:
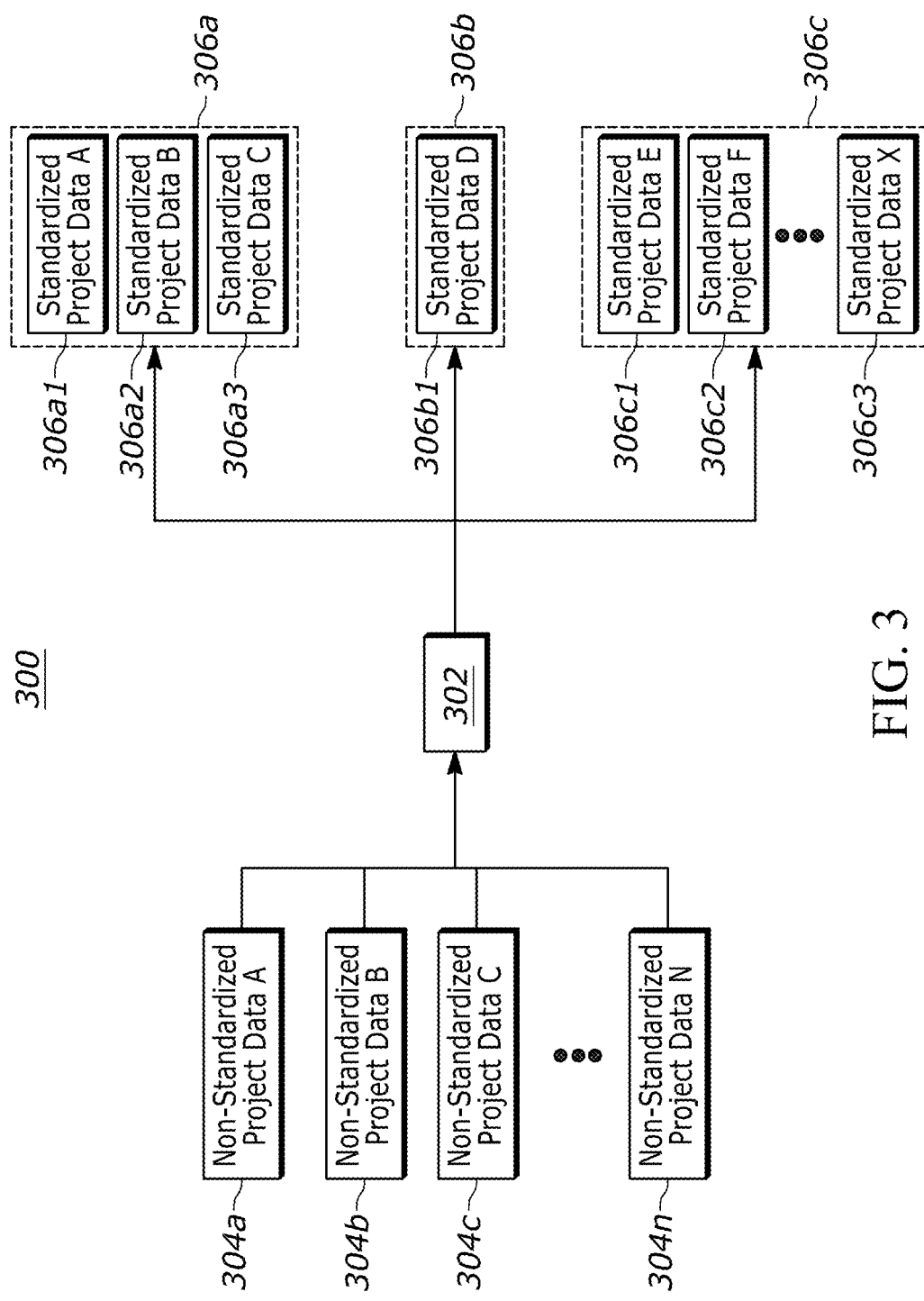
FIG. 3 illustrates an example project data standardization sequence utilizing standardized data storage templates, in accordance with various embodiments described herein.

FIG. 3 illustrates an example project data standardization sequence 300 utilizing standardized data storage templates, in accordance with various embodiments described herein. Generally speaking, the example project data standardization sequence 300 includes a standardization stage 302 that utilizes portions of the example computing environment 100 (e.g., ML models 106b, data storage application 106c, standardization instructions 106d) to convert a plurality of non-standardized project data 304a-304n into a plurality of standardized project data 306a1-3, 306b1, 306c1-3.

As illustrated in FIG. 3, the standardization stage 302 receives the plurality of non-standardized project data 304a-n, where N/n may be any integer value. While referenced herein as a plurality of non-standardized project data 304a-n, in certain instances, N/n may be 1, such that the standardization stage 302 receives a single non-standardized project data (e.g., non-standardized project data A 304a). Further, in some instances, N/n may be greater than 1, and the plurality of non-standardized project data 304a-n may include project data corresponding to multiple, different projects. Regardless, each non-standardized project data 304a-n received at the standardization stage 302 includes project data that is formatted in an arbitrary (e.g., non-standardized) format, and each individual non-standardized project data 304a-n may include project data that is formatted in different, arbitrary formats.

For example, the non-standardized project data A 304a may include a commitment with multiple values (e.g., fees, costs, expenses) related to a first project in a first non-standardized format, the non-standardized project data B 304b may include a lien waiver with multiple values (e.g., description of property, dates, costs/fees) related to the first project in a second non-standardized format, and the non-standardized project data C 304c may include an invoice with multiple values (e.g., fees, costs, services) related to a second project in a third non-standardized format. The standardization stage 302 receives and extracts project data from each of the non-standardized project data A-C 304a-c, clusters the extracted data, and outputs a standardized data storage template for the extracted project data.

The standardized data storage template accounts for each indicated/included data type(s) within project data by including data storage locations in the template/document created for each project data associated with the data storage template and provides memory-saving data storage structures (e.g., hierarchical labels, reference naming conventions, condensed data representations, etc.) within those templates/documents, as described herein. In particular, the standardized data storage template for the extracted project data from the data 304a may correspond with a commitment and/or that the extracted project data is or is associated with one or more data categories related to fees, costs, expenses, etc. of the first project. The standardized data storage template for the extracted project data from the data 304b may correspond with a lien waiver and/or that the extracted project data is or is associated with one or more data categories related to costs/fees, penalties, etc. of the first project. The standardized data storage template for the extracted project data from the data 304c may correspond with an invoice and/or that the extracted project data is or is associated with one or more data categories related to services, costs, fees, etc. of the second project.

Accordingly, the standardization stage 302 determines a standardized format for each non-standardized project data (e.g., 304a-n) associated with the standardized data storage template, converts the data to the respective standardized format(s), and stores the standardized data in one or more storage locations (e.g., storage locations 306a-c). Each of the storage locations 306a-c may represent storage locations within a project database (e.g., project database 106e) that correspond to particular standardization formats, data categories, and/or projects.

For example, the storage locations 306a-c may each represent a storage location within the project database for project data associated with particular data categories and/or clusters of a single/multiple projects. In this example, the storage location 306a stores the standardized project data A-C 306a1-3 that is all associated with a first data category or a first cluster and formatted in one or more standardized formats, the storage location 306b stores the standardized project data D 306b1 that is associated with a second data category and/or a second cluster and formatted in a standardized format, the storage location 306c stores the standardized project data E-X 306c1-3 that is all associated with a third data category and/or a third cluster and formatted in one or more standardized formats, and the first, second, and third storage locations 306a-c may correspond to one or more different projects.

As another example, the storage locations 306a-c may each represent storage locations within the project database for all project data that is formatted in accordance with respective standardized formats. In this example, the storage location 306a stores the standardized project data A-C 306a1-3 that is all formatted in accordance with a first standardized format, the storage location 306b stores the standardized project data D 306b1 that is formatted in accordance with a second standardized format, the storage location 306c stores the standardized project data E-X 306c1-3 that is all formatted in accordance with a third standardized format, and the first, second, and third standardized formats are all distinct from one another.

Thus, the example project data standardization sequence 300 represents a significant improvement over conventional project data storage techniques that are unable to intake, interpret, accurately store, and/or otherwise process non-standardized project data. The standardization stage 302 intelligently analyzes and extracts data from the non-standardized project data to determine predicted clusters, standardized data storage templates, data categories, and/or projects corresponding to the project data, re-formats the project data into a standardized format based on the clusters and corresponding standardized data storage template(s) and stores the standardized project data in a storage location associated with the correct project and data category/cluster.

By contrast, conventional techniques struggle to accurately interpret such non-standardized project data, and frequently misclassify, mis-categorize, and/or errantly store such non-standardized project data without adjusting the format, and thereby create substantial issues with the ongoing data management of the project, as described herein. Such issues are further compounded when extrapolated across multiple projects, where conventional techniques may misplace data in storage locations associated with different/wrong projects. Accordingly, the example project data standardization sequence 300 (and more particularly, the standardization stage 302) improves over these conventional techniques by creating a more accurate project data storage system, in part, through project data format standardization to aid in storage/retrieval efficiency within and across multiple projects.

Example Methods for Optimizing Data Storage

Figure 4:
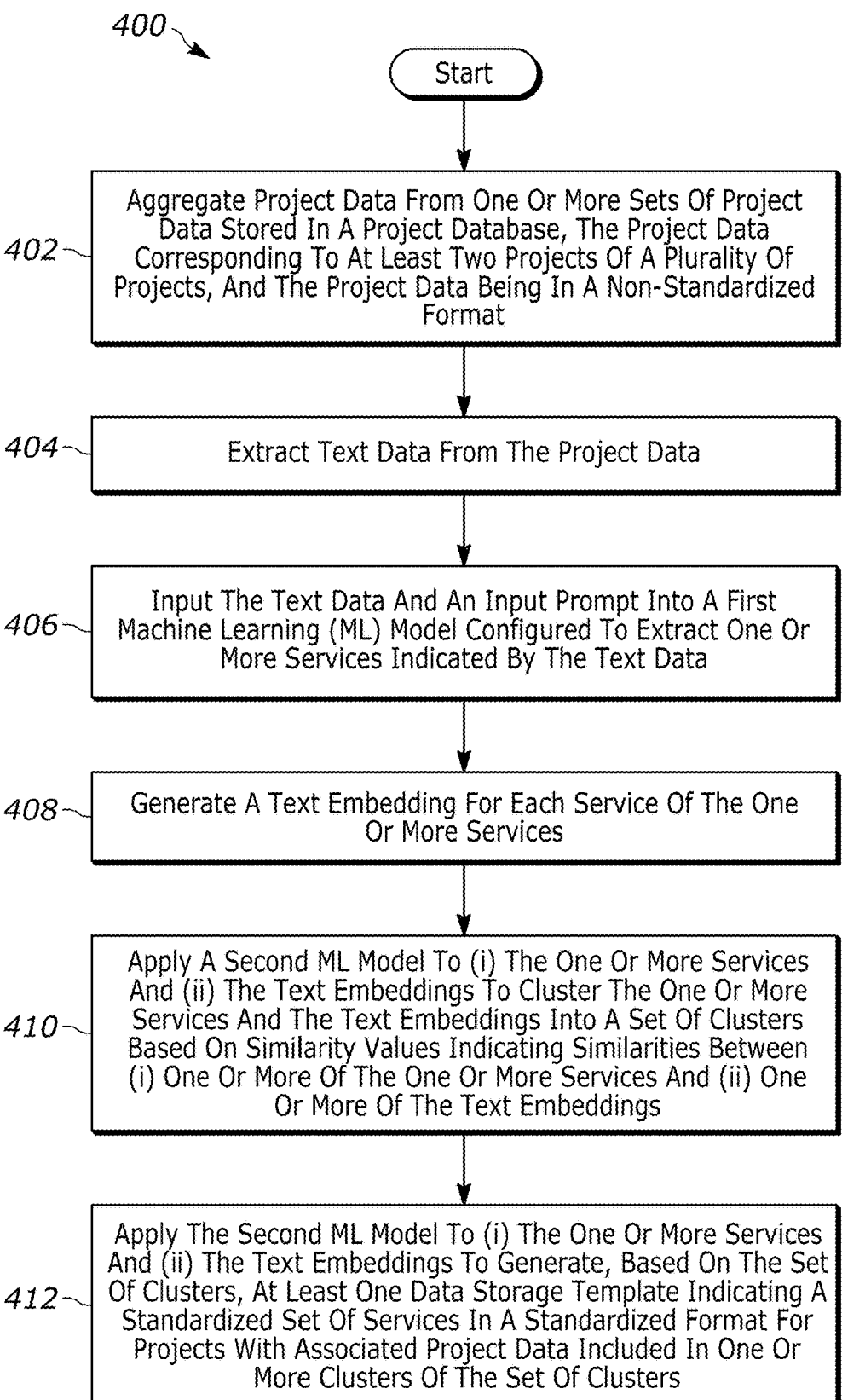
FIG. 4 illustrates an example method for improving project data storage by generating standardized data storage templates, in accordance with various embodiments described herein.

FIG. 4 illustrates an example method 400 for improving project data storage by generating standardized data storage templates, in accordance with various embodiments described herein. At least portions of the method 400 may be performed by one or more processors (e.g., processor(s) 108, 113) utilizing the embodiments of the user computing device 102, the host server 104, and/or the remote server 105 of FIG. 1, for example, or by other suitable modules or systems. In embodiments, the method 400 may include additional or alternate steps other than those described herein.

At block 402, the example method 400 includes aggregating project data from one or more sets of project data stored in a project database. The project data may correspond to at least two projects of a plurality of projects, and the project data is generally in a non-standardized format. The method 400 further includes extracting text data from the project data (block 404). The method 400 further includes inputting the text data and an input prompt into a first ML model configured to extract one or more services indicated by the text data (block 406).

The method 400 further includes generating a text embedding for each service of the one or more services (block 408). The method 400 further includes applying a second ML model to (i) the one or more services and (ii) the text embeddings to cluster the one or more services and the text embeddings into a set of clusters (block 410). Each the second ML model may cluster the data into the set of clusters based on similarity values indicating similarities between (i) one or more of the one or more services and (ii) one or more of the text embeddings. The method 400 further includes applying the second ML model to (i) the one or more services and (ii) the text embeddings to generate, based on the set of clusters, at least one data storage template indicating a standardized set of services in a standardized format for projects with associated project data included in one or more clusters of the set of clusters (block 412).

In some aspects, the second ML model is a clustering model, the at least one data storage template is a plurality of data storage templates, and applying the clustering model further includes: determining a primary data storage template indicating the standardized set of services based on a cluster size of a first cluster of the set of clusters.

In some aspects, the method 400 further includes generating the text embedding for the one or more services using a third ML model configured to generate text embeddings.

In some aspects, the first ML model is a large language model (LLM) and extracting the one or more services indicated by the text data further includes: inferring at least one of the one or more services from the text data.

In some aspects, the method 400 further includes receiving new project data associated with a new project, the new project data having a first file size; clustering the new project data into the one or more clusters of the set of clusters; converting the new project data into the standardized format indicated by a first data storage template of the at least one data storage template, wherein the converted new project data has a second file size that is less than the first file size; and storing the new project data in the project database.

In some aspects, the method 400 further includes determining one or more project thresholds based on project data stored in the project database in the standardized format; determining that the new project data exceeds at least one of the one or more project thresholds; and generating an alert in real-time for transmission to all entities associated with the new project.

In some aspects, the new project data is a first set of project data, the new project is a first project, and the method 400 further includes, in parallel with the first project by utilizing parallel processing, receiving a second set of project data associated with a second project, the second set of project data having a third file size; clustering the second set of project data into the one or more clusters of the set of clusters; converting the second set of project data into the standardized format indicated by the first data storage template, wherein the converted second set of project data has a fourth file size that is less than the third file size; and storing the second set of project data in the project database.

In some aspects, the method 400 further includes receiving a request corresponding to a new project; applying a third ML model to the request to output a request indication, wherein the third ML model is trained using a plurality of request training data and a plurality of project training data from the sets of project data to output a plurality training request indications; and displaying the request indication to a user associated with the new project.

In some aspects, the method 400 further includes applying a third ML model to new project data of a new project to output a request transmission indication, wherein the third ML model is trained using a plurality of request transmission training data and a plurality of project training data from the sets of project data to output a plurality training request transmission indications; displaying the request transmission indication to a user associated with the new project; and responsive to receiving an acceptance from the user, transmitting a new request to an entity managing the new project, wherein the new request includes request data corresponding to the request transmission indication.

In some aspects, the method 400 further includes receiving subsequent project data associated with a subsequent project; and applying the second ML model to the subsequent project data. Applying the second ML model includes: clustering the subsequent project data into a new cluster and generating a new data storage template indicating a new standardized set of services in a new standardized format for projects with associated project data included in the new cluster.

In some aspects, the second ML model is trained using a plurality of training project data as input to output a plurality of training data storage templates.

In some aspects, extracting the text data from the project data includes utilizing at least one of: (i) optical character recognition (OCR), (ii) image recognition, (iii) object recognition, or (iv) image extrapolation.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for improving project data storage by generating standardized data storage templates comprising:
   one or more processors; and
   one or more memories communicatively coupled with the one or more processors,
   the one or more memories storing a project database storing sets of project data for a plurality of projects, and computer executable instructions that, when executed by the one or more processors, cause the one or more processors to:
   aggregate project data from the sets of project data corresponding to at least two projects of the plurality of projects, the project data being in a non-standardized format,
   extract text data from the project data,
   input the text data and an input prompt into a first machine learning (ML) model configured to extract one or more services indicated by the text data,
   generate a text embedding for each service of the one or more services, and
   apply a second ML model to (i) the one or more services and (ii) the text embeddings, wherein applying the second ML model includes:
   clustering the one or more services and the text embeddings into a set of clusters based on similarity values indicating similarities between (i) one or more of the one or more services and (ii) one or more of the text embeddings,
   generating, based on the set of clusters, a plurality of data storage templates indicating a standardized set of services in a standardized format for projects with associated project data included in one or more clusters of the set of clusters, and
   determining a primary data storage template based on a cluster size of a first cluster of the set of clusters.

2. The system of claim 1, wherein the second ML model is a clustering model.

3. The system of claim 1, wherein the computer executable instructions, when executed by the one or more processors, cause the one or more processors to:

generate the text embedding for the one or more services using a third ML model configured to generate text embeddings.

4. The system of claim 1, wherein the first ML model is a large language model (LLM), and wherein extracting the one or more services indicated by the text data further includes:

inferring at least one of the one or more services from the text data.

5. The system of claim 1, wherein the computer executable instructions, when executed by the one or more processors, cause the one or more processors to:

receive new project data associated with a new project, the new project data having a first file size;

cluster the new project data into the one or more clusters of the set of clusters;

convert the new project data into the standardized format indicated by a first data storage template of the plurality of data storage templates, wherein the converted new project data has a second file size that is less than the first file size; and store the new project data in the project database.

6. The system of claim 5, wherein the computer executable instructions, when executed by the one or more processors, cause the one or more processors to:

determine one or more project thresholds based on project data stored in the project database in the standardized format;

determine that the new project data exceeds at least one of the one or more project thresholds; and generate an alert in real-time for transmission to all entities associated with the new project.

7. The system of claim 5, wherein the new project data is a first set of project data, the new project is a first project, and the computer executable instructions, when executed by the one or more processors, further cause the one or more processors to, in parallel with the first project by utilizing parallel processing:

receive a second set of project data associated with a second project, the second set of project data having a third file size;

cluster the second set of project data into the one or more clusters of the set of clusters;

convert the second set of project data into the standardized format indicated by the first data storage template, wherein the converted second set of project data has a fourth file size that is less than the third file size; and store the second set of project data in the project database.

8. The system of claim 1, wherein the computer executable instructions, when executed by the one or more processors, further cause the one or more processors to:

receive a request corresponding to a new project;

apply a third ML model to the request to output a request indication, wherein the third ML model is trained using a plurality of request training data and a plurality of project training data from the sets of project data to output a plurality training request indications; and display the request indication to a user associated with the new project.

9. The system of claim 1, wherein the computer executable instructions, when executed by the one or more processors, further cause the one or more processors to:

apply a third ML model to new project data of a new project to output a request transmission indication, wherein the third ML model is trained using a plurality of request transmission training data and a plurality of project training data from the sets of project data to output a plurality training request transmission indications;

display the request transmission indication to a user associated with the new project; and responsive to receiving an acceptance from the user, transmitting a new request to an entity managing the new project, wherein the new request includes request data corresponding to the request transmission indication.

10. The system of claim 1, wherein the computer executable instructions, when executed by the one or more processors, cause the one or more processors to:

receive subsequent project data associated with a subsequent project; and apply the second ML model to the subsequent project data, wherein applying the second ML model includes:

clustering the subsequent project data into a new cluster, and generating a new data storage template indicating a new standardized set of services in a new standardized format for projects with associated project data included in the new cluster.

11. The system of claim 1, wherein the second ML model is trained using a plurality of training project data as input to output a plurality of training data storage templates.

12. The system of claim 1, wherein extracting the text data from the project data includes utilizing at least one of: (i) optical character recognition (OCR), (ii) image recognition, (iii) object recognition, or (iv) image extrapolation.

13. A computer-implemented method for improving project data storage by generating standardized data storage templates comprising:

aggregating, by one or more processors, project data from one or more sets of project data stored in a project database, the project data corresponding to at least two projects of a plurality of projects, and the project data being in a non-standardized format;

extracting, by the one or more processors, text data from the project data;

inputting, by the one or more processors, the text data and an input prompt into a first machine learning (ML) model configured to extract one or more services indicated by the text data;

generating, by the one or more processors, a text embedding for each service of the one or more services; and applying, by the one or more processors, a second ML model to (i) the one or more services and (ii) the text embeddings, wherein applying the second ML model includes:

clustering the one or more services and the text embeddings into a set of clusters based on similarity values indicating similarities between (i) one or more of the one or more services and (ii) one or more of the text embeddings, generating, based on the set of clusters, a plurality of data storage templates indicating a standardized set of services in a standardized format for projects with associated project data included in one or more clusters of the set of clusters, and determining a primary data storage template based on a cluster size of a first cluster of the set of clusters.

14. The computer-implemented method of claim 13, wherein the second ML model is a clustering model.

15. The computer-implemented method of claim 13, further comprising:

generating, by the one or more processors, the text embedding for the one or more services using a third ML model configured to generate text embeddings.

16. The computer-implemented method of claim 13, wherein the first ML model is a large language model (LLM), and wherein extracting the one or more services indicated by the text data further includes:

inferring, by the one or more processors, at least one of the one or more services from the text data.

17. The computer-implemented method of claim 13, further comprising:

receiving, at the one or more processors, new project data associated with a new project, the new project data having a first file size;

clustering, by the one or more processors, the new project data into the one or more clusters of the set of clusters;

converting, by the one or more processors, the new project data into the standardized format indicated by a first data storage template of the plurality of data storage templates, wherein the converted new project data has a second file size that is less than the first file size; and storing, by the one or more processors, the new project data in the project database.

18. The computer-implemented method of claim 13, further comprising:

receiving, at the one or more processors, a request corresponding to a new project;

applying, by the one or more processors, a third ML model to the request to output a request indication, wherein the third ML model is trained using a plurality of request training data and a plurality of project training data from the sets of project data to output a plurality training request indications; and displaying, by the one or more processors, the request indication to a user associated with the new project.

19. A tangible machine-readable medium comprising instructions that, when executed, cause a machine to at least:

aggregate project data from one or more sets of project data corresponding to at least two projects of a plurality of projects, the project data being in a non-standardized format;

extract text data from the project data;

input the text data and an input prompt into a first machine learning (ML) model configured to extract one or more services indicated by the text data;

generate a text embedding for each service of the one or more services; and apply a second ML model to (i) the one or more services and (ii) the text embeddings, wherein applying the second ML model includes:

clustering the one or more services and the text embeddings into a set of clusters based on similarity values indicating similarities between (i) one or more of the one or more services and (ii) one or more of the text embeddings, generating, based on the set of clusters, a plurality of data storage templates indicating a standardized set of services in a standardized format for projects with associated project data included in one or more clusters of the set of clusters, and determining a primary data storage template based on a cluster size of a first cluster of the set of clusters.

20. The tangible machine-readable medium of claim 19, wherein the instructions, when executed, cause the machine to at least:

receive a request corresponding to a new project;

apply a third ML model to the request to output a request indication, wherein the third ML model is trained using a plurality of request training data and a plurality of project training data from the sets of project data to output a plurality training request indications; and display the request indication to a user associated with the new project.

* * * * *